United States Patent [19]

Garland

[11] Patent Number: 4,755,436

[45] Date of Patent: Jul. 5, 1988

[54] INTER-PLY ADHESION BETWEEN SARAN AND LINEAR ETHYLENE COPOLYMERS

[75] Inventor: Steven B. Garland, Simpsonville, S.C.

[73] Assignee: W. R. Grace & Co., Cryovac Div., Duncan, S.C.

[21] Appl. No.: 880,258

[22] Filed: Jun. 30, 1986

[51] Int. Cl.$^4$ ............................................. B32B 27/08
[52] U.S. Cl. ....................................... 428/518; 428/36
[58] Field of Search ................. 428/518, 516, 35, 913, 428/216

[56] References Cited

U.S. PATENT DOCUMENTS

| | | |
|---|---|---|
| 3,682,767 | 8/1972 | Britton et al. .................. 428/518 X |
| 3,741,253 | 6/1973 | Brax et al. . . |
| 3,924,051 | 12/1975 | Wiggins et al. . |
| 4,409,286 | 10/1983 | Decroix ........................... 428/518 X |
| 4,424,243 | 1/1984 | Nishimoto et al. . |
| 4,456,646 | 6/1984 | Nishimoto et al. . . |
| 4,457,960 | 7/1984 | Newsome . |
| 4,495,249 | 1/1985 | Ohya et al. . . |
| 4,565,720 | 1/1986 | Yaeo et al. ...................... 428/518 X |
| 4,578,294 | 3/1986 | Ouchi et al. ................... 428/518 X |

*Primary Examiner*—George F. Lesmes
*Assistant Examiner*—D. R. Zirker
*Attorney, Agent, or Firm*—John J. Toney; William D. Lee, Jr.; Jennifer L. Skord

[57] ABSTRACT

A multi-layer film is disclosed having improved adhesion between layers and consisting essentially of the following elements:

(a) a layer consisting essentially of vinylidene chloride copolymer; and, (b) a layer consisting essentially of about 5-40 wt. % of ethylene/butyl-acrylate copolymer having a melting point of about 110° C. blended with about 95-60 wt. % of linear ethylene/alpha-olefin copolymer.

4 Claims, 1 Drawing Sheet

BOND-STRENGTH

INTER-PLY ADHESION BETWEEN SARAN AND LINEAR ETHYLENE COPOLYMERS

FIELD OF THE INVENTION

This invention relates to a method of improving the adhesion between a layer of vinylidene chloride copolymer and a layer of a linear ethylene/alpha/olefin copolymer and to the film produced thereby. More particularly, the invention relates to heat shrinkable films having a barrier layer of vinylidene chloride copolymer and a layer of linear low density polyethylene or very low density polyethylene and to a method for increasing the adhesion between the layers and thereby decreasing the incidence of delamination.

DEFINITIONS AND ABBREVIATIONS

As used herein, the terms and abbreviations set forth below will be understood to be defined as stated:

LLDPE is an abbreviation for linear low density polyethylene and refers to copolymers of ethylene having: (1) a higher-alpha-olefin such as butene, octene, hexene, etc. as a comonomer; (2) a density of from about 0.910 to as high as about 0.935 grams per cubic centimeter; (3) molecules comprising long chains with few or no branches or cross-linked structures; and, (4) being produced at low to medium pressures by copolymerization using heterogeneous catalysts based on transition metal compounds of variable valance.

VLDPE is an abbreviation for very low density polyethylene and refers to copolymers of ethylene having: (1) a greater proportion of higher alpha-olefin as a comonomer, in general, than LLDPE; (2) a density of about 0.910 to 0.86 or lower; (3) little low temperature embrittlement; and, (4) then produced by a catalytic, low pressure process at a pressure of no greater than 7,000 KPA.

Saran or PVDC refers to copolymers of vinylidene chloride in which the vinylidene chloride monomer comprises at least 51% of the copolymer. Generally, saran is desirable as a layer in multi-layer thermoplastic film constructions because of its oxygen barrier properties.

EVA refers to copolymers of ethylene and vinyl acetate. The vinyl acetate content may range from a low of 2 or 3% to a high of 30 or 40% depending upon the desired properties.

EBA refers to ethylene/butyl-acrylate copolymer and the butyl-acrylate monomer content may vary from as low as about 2% to 18% or higher by weight.

BACKGROUND

Heat shrinkable polymeric films are widely used for packaging of fresh and processed meats, cheeses, poultry and a large number of non-food items. Some of the films are formed into heat shrinkable bags or pouches which are supplied to the meat packer.

Processing and distribution requirements demand that the film and bags made therefrom have a wide range of difficult-to-meet properties. Of great importance to the packer is the capability of a bag to survive physically the process of being filled, evacuated, sealed, heat shrunk, and shipped to various distribution points. The bag must be strong enough to survive the material handling and also physically protect the enclosed product.

It is also desirable that the bag serve as a barrier to oxygen and other materials which could cause spoilage of a product wrapped in the film. Furthermore, it is desirable that such a bag be heat shrinkable below the boiling point of water so that high temperatures do not have to be employed to shrink the bag and a convenient heat transfer medium such as hot water can be employed.

One successful heat shrinkable bag having a barrier layer of saran is disclosed in U.S. Pat. No. 3,741,253 which issued to H. J. Brax et al on June 26, 1973. In the Brax patent the multi-ply film has a substrate or sealing layer of cross-linked EVA, a central layer of saran, and an outer or abuse layer of EVA. The inner or sealing layer is referred to as the base or substrate layer. In this instance it is extruded as a tube and is cross-linked and the saran and abuse layer of EVA are extrusion coated thereonto. Thus, a tube is formed which is thereafter heated to orientation temperature, stretched and then rapidly cooled to form an oriented or heat shrinkable film. Bags are then made by transversely sealing across the tubular structure. Hence, the substrate layer is also the inner layer which is heat sealed to itself to form the seal across the bottom of a bag. The other EVA layer protects the saran from scratches and pin holes and receives the abuse of handling and contact with other packages and surfaces. Hence, it known as the "abuse" layer.

As linear copolymers of ethylene known as LLDPE began to become commercially available, they were incorporated into various monolayer and multi-layer structures. In order that the LLDPE layers would extrude more readily and adhere to adjacent film layers, it was found convenient to blend the LLDPE with EVA. Typical patents which disclose layers of LLDPE blended with EVA in a multi-layer, barrier structure are U.S. Pat. Nos. 3,682,767 which issued on Aug. 8, 1972 to Arthur Wray Britton et al; 4,456,646 which issued to Nishimoto et al on June 26, 1984; 4,495,249 which issued on Jan. 22, 1985 to Ohya et al; 4,424,243 which issued on Jan. 3, 1984 to Nishimoto et al; and, 4,457,960 which issued on July 3, 1984 to David L. Newsome.

One of the primary objects of the present invention is to provide a multi-layer barrier film employing layers of LLDPE in which the adhesion to adjacent saran layers is improved over similar structures in the prior art. In the Britton patent, mentioned above, a copolymer of ethylene with ethyl-acrylate is mentioned along with the copolymer of ethylene/vinyl-acetate. But no specific example showing the use of ethylene/ethyl-acrylate is given. In Nishimoto '243, mentioned above, the broad term ethylene/alkyl acrylate is used. But, the only example is, again, ethylene/ethyl-acrylate with a crystalline melting point of 89° C. wherein 18% of the copolymer is ethyl-acrylate. In Nishimoto '243 the ethylene/ethyl-acrylate is used only as an unblended adhesive layer. In Ohya '249 the same ethylene/ethyl-acrylate copolymer is used having a melt index of 6 and crystalline melting point of 90° C. and 18% by weight of ethyl-acrylate unit. In Ohya '249 the ethylene/ethyl-acrylate copolymer is blended with polyethylene modified by carboxylic acid and used as an adhesive layer.

It is another primary object to employ an ethylene copolymer in a blend with LLDPE or VLDPE to achieve a superior barrier film.

These and other objects are achieved by the invention which is summarized below.

SUMMARY OF THE INVENTION

In one aspect, the present invention is a method of improving the adhesion between a layer of vinylidene chloride copolymer and a layer of a linear ethylene/alpha-olefin copolymer comprising the steps of blending ethylene/butyl-acrylate copolymer with the linear ethylene/alpha-olefin copolymer; and melt joining a layer of said blended copolymer directly to a layer of vinylidene chloride copolymer. The method includes the step of melt joining where the layers are either coextruded or extrusion coated one onto the other. A preferred ethylene/alpha-olefin copolymer for blending with the ethylene/butyl-acrylate is one having a density of less than about 0.920 grams per cubic centimeter.

In another aspect, the invention is a multi-layer film having improved adhesion between layers including a layer comprising vinylidene chloride copolymer; and, a blended layer directly joined to the vinylidene chloride copolymer layer, said blended layer comprising about 5% to about 40% by weight of ethylene/butyl-acrylate copolymer blended with about 95% to about 60% by weight of linear ethylene/alpha-olefin copolymer.

In still another aspect, the invention is an improvement in making a multi-layer, heat shrinkable, packaging film having a layer comprising a vinylidene chloride copolymer and a layer adjacent thereto comprising a linear ethylene/alpha-olefin copolymer wherein the improvement comprises blending at least 5% by weight of ethylene/butyl-acrylate copolymer in the mixture comprising the linear copolymer layer to improve the adhesion between the two layers.

In yet another aspect, the invention is an improvement in the process of making a heat shrinkable bag constructed from multi-layer thermoplastic film having a barrier layer of vinylidene chloride copolymer and an adjacent layer comprising a linear ethylene/alpha-olefin copolymer wherein the improvement comprises blending at least about 5% by weight of ethylene/butyl-acrylate copolymer in the linear copolymer mixture of the adjacent layer thereby improving the adhesion between the adjacent and barrier layers.

The nature, utility and further features of the present invention will be more clearly understood from the following detailed description when read in conjunction with the accompanying drawings.

DESCRIPTION OF THE DRAWINGS

Attached hereto and made a part of this disclosure are drawings in which.

DETAILED DESCRIPTION

Figure 1:
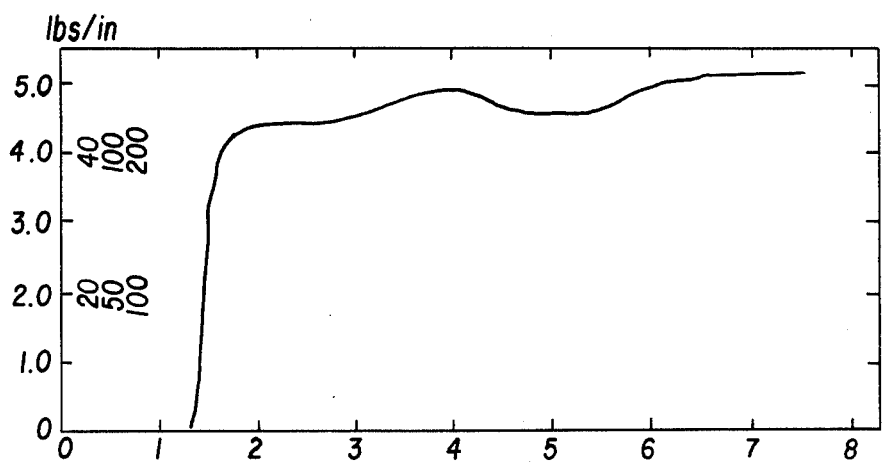
FIG. 1 is a graph of the bond strength of a layer of a preferred blend of the present invention and a PVDC layer showing the force required to separate the layers as they are peeled apart.

One method of preparing the film according to the present invention is disclosed in U.S. Pat. No. 3,741,253 which issued on June 26, 1973 to Harri J. Brax et al. To prepare the preferred embodiment according to the Brax process, a substrate of ethylene/vinyl-acetate copolymer is extruded as a mono-layer or, if desired, a two-layer film of ethylene/vinyl-acetate copolymer can be coextruded at this point wherein the vinyl acetate copolymer of the ethylene/vinyl-acetate in each layer is different. As the molten film leaves the extruder, it is in the form of a tube which is preferably 3 to 4 inches in diameter. This film is cooled, flattened into what is referred to in the art as "tape" and then fed through an irradiation vault to cross-link the material by irradiation. As an alternate, the EVA tape or tubing can be chemically cross-linked in which a well-known chemical cross-linking agent such as one of the peroxides can be included in the blended mixture in the extruder to thereby chemically cross-link the material.

After the cross-linking step is completed, the film is inflated into a tubing and fed through an extrusion coating die which is fed by an extruder. A single layer of saran can be extrusion coated onto the tube at this point or two layers may be extrusion coated onto the substrate, that is, the PVDC layer and the abuse layer can be coextruded and leave the coextrusion die as a two-layer co-extrudate which is then coated onto the inflated substrate as it passes through the die. If this method is not used, then the extrusion coating of a single layer is repeated after the PVDC layer is extrusion coated onto the substrate so that the abuse layer is extrusion coated onto the PVDC layer. In either event, the abuse layer and the PVDC layer are melt joined and contact each other while they are still in a molten or semi-molten state and the contact is made before they have solidified into self-supporting film layers. No adhesive between the PVDC layer and the abuse layer is contemplated by the present invention as it is one of the objects of the present invention to eliminate the necessity for an adhesive layer.

The abuse layer preferably contains about 20% ethylene/butyl-acrylate copolymer (EBA) blended in with 80% linear low density polyethylene. The LLDPE or VLDPE, as the case may be, preferably has a density of less than 0.920 and more preferably in the range 0.905 to 0.915. When its density is below 0.910, as defined herein, the linear copolymer is designated as a very low density polyethylene (VLDPE). The ethylene/butyl-acrylate copolymer preferably has a butyl-acrylate content in the range of 2% to 6% and the ethylene/butyl-acrylate copolymer content in the blend can run between 5% and 40% by weight. The density of typical ethylene/butyl-acrylate copolymer runs from 0.921 to 0.923 and melt temperatures are typically about 110° C.

After the abuse layer is extruded onto the PVDC layer, the unstretched multi-layer tube is cooled and collapsed and either rolled up into storage or fed immediately into a hot bath where it is brought up to the orientation temperature of the film and biaxially oriented by the trapped bubble technique. The biaxially oriented film is quenched to freeze the molecular orientation and the film is then collapsed and wound up. From this point the film which is now in the form of a stretched, heat shrinkable flattened tube can be longitudinally slit to make sheet film or it can be transversely sealed and severed to make heat shrinkable bags. These heat shrinkable bags by virtue of the gas barrier layer provided by the PVDC layer and by the abuse layer make excellent vacuum bags for the packaging of fresh and processed meats, cheese, poultry, and fish.

Looking now at the drawings, the dramatic increase in bond strength achieved by the present invention will be demonstrated. In FIG. 4 a conventional layer of 93% linear low density polyethylene blended with 7% EVA was extrusion coated onto a PVDC layer as the abuse layer and the multi-layer film was biaxially oriented. Subsequently, a one-inch wide sample was cut from the film and with the aid of solvents the PVDC layer was separated from the abuse layer for a distance of slightly more than an inch with the remainder of the sample strip remaining bonded, the separated portions forming grip tabs. After the solvent has been sufficiently dried and removed from the film so that it will not affect the results, one tab was placed in one jaw of an Instron test machine and the other tab in the other jaw. The jaws were then separated and the threshold force to pull the layers apart was recorded and as the jaws continued to move away a tracing was made of the force required to continue the separation. This is what is shown in FIGS. 1-4. Since the film strip was one-inch wide, the ordinate is reported in pounds per inch. The abscissa is reported in inches which is the separation distance of the jaws.

Looking at FIGS. 1-4, FIG. 1 is a preferred embodiment in which the abuse layer is 80% LLDPE blended with 20% EBA. It will be seen that the bond strength is in the range of 4.2 to 5.0 pounds per inch.

Figure 2:
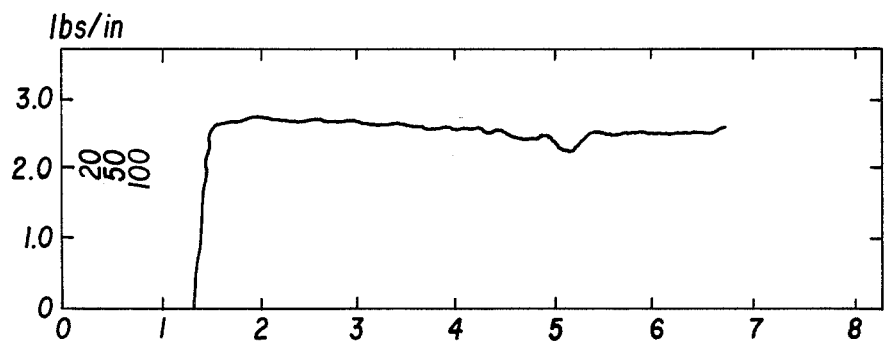
FIG. 2 is a graph similar to FIG. 1 except that the layer adjacent to the PVDC layer is a layer of 100% EVA copolymer.

In FIG. 2 the abuse layer is 100% ethylene/vinyl-acetate copolymer having 12% vinyl acetate and the bond strength is in the range of 2.7 to 2.3 pounds per inch.

Figure 3:
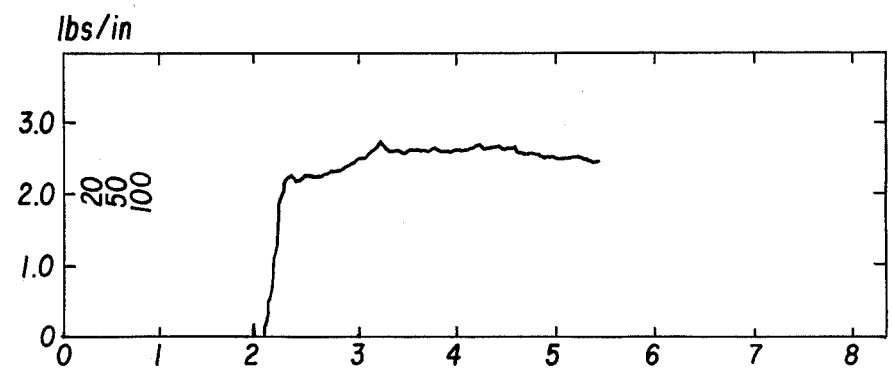
FIG. 3 is similar to FIGS. 1 and 2 except that the layer adjacent to the PVDC layer is a blend of 90% EVA with 10% LLDPE.
Figure 4:
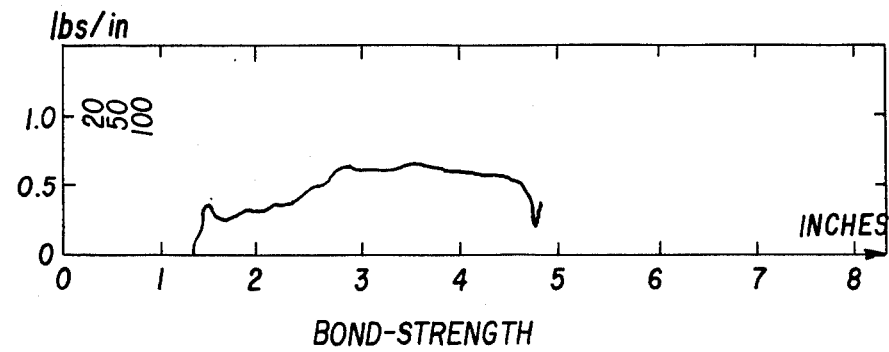
FIG. 4 is similar to FIGS. 1-3 except that the layer adhered to the PVDC layer is 93% LLDPE blended with 7% EVA.

In FIG. 3 the abuse layer is 90% EVA blended with 10% LLDPE and the bond strength ranges from 2.2 pounds per inch to 2.7 pounds per inch.

In FIG. 4 the abuse layer is 93% LLDPE blended with 7% EVA and the bond strength runs from about 0.25 pounds per inch to 0.7 pounds per inch.

In considering the results of FIGS. 1-4, it is quite evident that a blend of LLDPE with EBA provides an abuse layer with vastly superior bond strength to the PVDC layer. Such a result is quite surprising and unexpected.

EXAMPLE 1

Example 1 is the film represented in FIG. 1 where the abuse layer is 80% LLDPE blended with 20% EBA. The substrate and PVDC layer were prepared according to the Brax et al patent mentioned. The LLDPE was Dowlex brand from Dow Chemical Co. having a density of 0.920 and a melt index of 1.0. The ethylene/butyl-acrylate was Norchem NBA copolymer No. 714 having a density of 0.921 and melt index of 3.2.

EXAMPLE 2

A second example with a substrate and PVDC layer prepared according to the Brax et al patent used a Dowlex LLDPE resin having a density of 0.917 blended with 15% EBA which is the Norchem 714 resin. An excellent abuse layer resulted having superior bonding strength of approximately 4.5 lbs./in.

EXAMPLE 3

An abuse layer was prepared from a Dowlex linear copolymer having a density 0.908. About 85% of this resin was blended with 15% of the Norchem 714 with similar surprisingly good results.

The indication is that with lower density LLDPE or VLDPE, i.e., less than 0.920 g/cc and preferably 0.905 g/cc to 0.915 g/cc, the adhesion improvement provided by the ethylene/butyl-acrylate copolymer increases significantly. Also, it is expected that significantly increased adhesion between the blended layer and the saran layer can be achieved by blending 5% to 40% by weight of ethylene/butyl-acrylate into either LLDPE or VLDPE in the blended layer with the optimum range being in the 10% to 25% range.

The work done further indicates that the invention is generally applicable to blends of ethylene/butyl-acrylate with the linear/alpha-olefin copolymers and results of similar nature are to be expected with any of the various vinylidene chloride copolymer resins which are generally designated as saran or PVDC.

Having thus described my invention, I claim:

1. A multi-layer film having improved adhesion between layers consisting essentially of :
    (a) a layer consisting essentially of vinylidene chloride copolymer; and,
    (b) a blended layer directly joined to the vinylidene chloride copolymer layer, said blended layer consisting essentially of about 5% to about 40% by weight of ethylene/butyl-acrylate copolymer having a melting point of about 110° C. blended with about 95% to about 60% by weight of linear ethylene/ alpha-olefin copolymer.

2. The film of claim 1 wherein the linear ethylene/alpha-olefin copolymer has a density of less than about 0.920 gms/cc.

3. The film of claim 1 wherein the butyl acrylate content of the ethylene/butyl-acrylate is in the range of about 2% to about 6% by weight.

4. A multi-layer film having improved adhesion between layers comprising:
    (a) a layer comprising vinylidene chloride copolymer;
    (b) a blended layer directly joined to the vinylidene chloride copolymer layer, said blended layer comprising about 5% to about 40% by weight of ethylene/butyl-acrylate copolymer blended with about 95% to about 60% by weight of linear ethylene/alpha-olefin copolymer, and
    (c) wherein the vinylidene chloride copolymer layer is joined, on its surface opposite the surface joined to the blended layer, to a layer consisting essentially of ethylene/butyl-acrylate copolymers with ethylene polymers or copolymers.

* * * * *